No. 698,930. Patented Apr. 29, 1902.
E. A. GARVER & D. V. STOUT.
WHEELBARROW.
(Application filed Sept. 6, 1901.)

(No Model.)

Witnesses:
George Barry Jr.
Henry Thieme.

Inventors:
Edward A. Garver and
Donald V. Stout
by attorneys

UNITED STATES PATENT OFFICE.

EDWARD A. GARVER AND DONALD V. STOUT, OF CHICAGO, ILLINOIS.

WHEELBARROW.

SPECIFICATION forming part of Letters Patent No. 698,930, dated April 29, 1902.

Application filed September 6, 1901. Serial No. 74,519. (No model.)

*To all whom it may concern:*

Be it known that we, EDWARD A. GARVER and DONALD V. STOUT, citizens of the United States, and residents of Chicago, in the county of Cook and State of Illinois, have invented new and useful Improvements in Wheelbarrows, of which the following is a specification.

Our invention relates to improvements in wheelbarrows, and more particularly to wheelbarrow-frames which are so constructed and arranged that the several parts of the frame may be made adjustable to metal or wooden trays of different shapes and sizes.

A further object is to provide a wheelbarrow-frame which will be very strong and rigid, in which the wheel is mounted in the frame independently of the handle-bars, and in which the load may be readily placed directly over the wheel, thus making a perfectly-balanced wheelbarrow and relieving a great portion of the weight from the operator.

A practical embodiment of our invention is represented in the accompanying drawings, in which—

Figure 1:
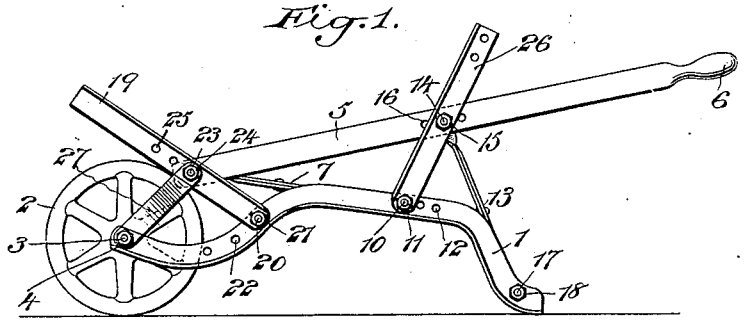
Figure 2:
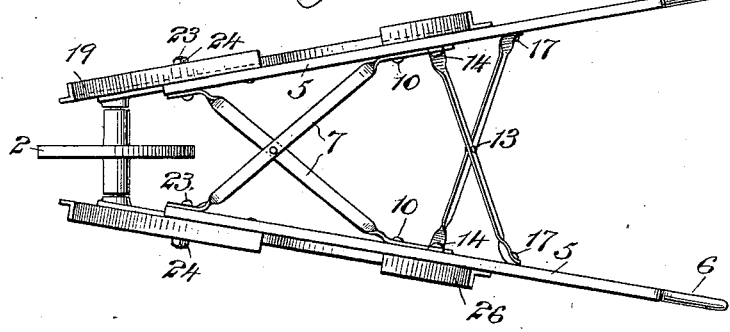
Figure 3:
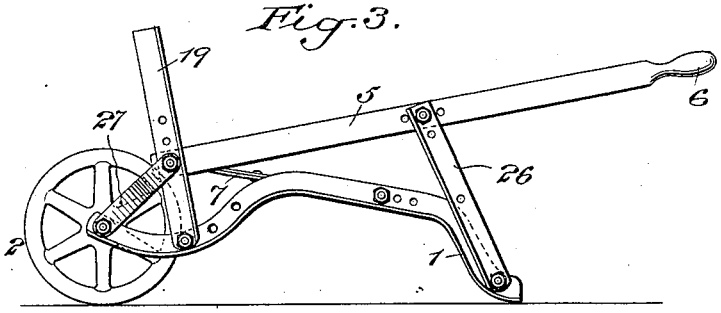
Figure 4:
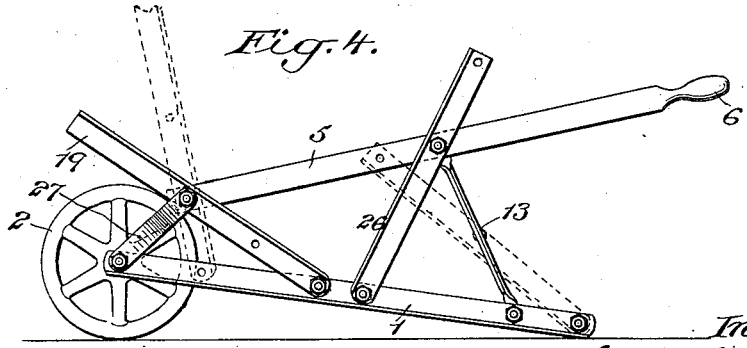

Figure 1 represents the wheelbarrow-frame in side elevation. Fig. 2 is a top plan view of the same. Fig. 3 is a side view showing the front and back braces in another adjustment from that represented in Figs. 1 and 2; and Fig. 4 is a view in side elevation of a modified form of wheelbarrow-frame in which the lower side bar is represented as straight, the front and rear braces being shown in full lines in one position and in dotted lines in another position.

The combined lower side bars and supporting-legs of the wheelbarrow-frame are denoted by 1.

The barrow-wheel is denoted by 2, and it is mounted to rotate upon an axle 3, removably secured to the front ends of the combined lower side bars and supporting-legs 1 by nuts 4.

The combined upper side and handle bars are denoted by 5, and their rear ends are developed into suitable handles 6 for use in wheeling the barrow.

Two pairs of cross-braces serve to rigidly space the several upper and lower side bars apart. The front pair of cross-braces (denoted by 7) has its front ends secured to the inner faces of the combined upper side and handle bars 5 by means of removable bolts 23, having lock-nuts 24. The rear ends of the cross-brace 7 are adjustably secured to the inner faces of the combined lower side bars and supporting-legs 1 by means of removable bolts 10, having lock-nuts 11, each of which bolts passes through one of a series of holes 12 in the lower side bar.

The rear cross-brace is denoted by 13, and it has its front ends removably secured to the inner faces of the upper side bars 5 by means of removable bolts 14, having nuts 15, each of the said bolts 14 passing through one of a series of holes 16 in the upper side bar.

The lower ends of the cross-brace 13 are removably secured to the inner faces of the lower side bars 1, near the rear ends thereof, by means of removable bolts 17, having nuts 18 thereon.

The front side braces are denoted by 19, and each of the said braces is adjustably secured at its lower end to one of the lower side bars 1 by means of a bolt 20 and a lock-nut 21, which bolt 20 passes through one of a series of holes 22 in the lower side bar. The said front side brace 19 is adjustably secured to the front end of the combined upper side and handle bar 5 by means of a removable bolt 23, provided with a lock-nut 24, which bolt 23 passes through one of a series of holes 25 in the said front side braces 19.

The rear side braces are denoted by 26, and each of the said braces is removably secured at its lower end when in one position to the lower side bar 1 by means of the bolt 10 and nut 11, which also secures one of the rear ends of the cross-brace 7, hereinbefore mentioned. The rear side brace 26 is also removably secured to the combined upper side and handle bar 5 by means of the bolt 14 and lock-nut 15, which serve to secure the upper end of one arm of the cross-brace 13, hereinbefore mentioned. When the rear side brace 26 is in another position, its combined lower end is removably secured to the rear end of the lower side bar and supporting-leg 1 by means of the bolt 17 and lock-nut 18, which secures the end of one of the arms of the cross-brace 13 to the said combined lower side bar and supporting-leg. When in this adjustment, the upper end of the rear side brace 26 is secured to the combined upper side and handle bar 5 by the bolt 14 and lock-nut 15.

Side connecting-braces 27 connect the forward ends of the combined lower side bars and supporting-legs 1 with the forward ends of the combined upper side and handle bars 5, the said connecting-braces 27 being removably secured in position by means of the axle 3 and lock-nuts 4 at one end and the bolts 23 and lock-nuts 24 at the other end.

It will be seen that the structure hereinabove described will permit the front and rear side braces 19 and 26 to be adjusted to suit trays of different shapes and sizes. It will also be seen that the load may be placed directly over the wheel, because of the construction and arrangement of the several parts of the frame, in a very ready and convenient manner.

In Figs. 1, 2, and 3 we have represented the combined lower side bars and supporting-legs of a double-curved form, so as to give a greater adjustability to the several braces. However, the said combined lower side bars and supporting-legs may be made straight, as shown in Fig. 4, and yet give a desirable change in the adjustment of the front and rear side braces, which support the tray. (Not shown herein.)

It is evident that changes might be resorted to in the construction, form, and arrangement of the several parts without departing from the spirit and scope of our invention. Hence we do not wish to limit ourselves strictly to the structure herein set forth; but

What we claim is—

1. A wheelbarrow-frame comprising combined upper side and handle bars, combined lower side bars and supporting-legs, a wheel, front and rear tray-supporting side braces adjustably secured to the combined upper side and handle bars and to the combined lower side bars and supporting-legs and connecting-braces secured to the forward ends of the said combined upper side and handle bars and to the forward ends of the combined lower side bars and supporting-legs, substantially as set forth.

2. A wheelbarrow-frame comprising combined upper side and handle bars, combined lower side bars and supporting-legs, cross-braces adjustably secured to the combined upper side and handle bars and to the combined lower side bars and supporting-legs for spacing them apart and side braces secured to the said combined upper side and handle bars and combined lower side bars and supporting-legs, substantially as set forth.

3. A wheelbarrow-frame comprising combined upper side and handle bars, combined lower side bars and supporting-legs, cross-braces adjustably secured to the combined upper side and handle bars and to the combined lower side bars and supporting-legs and side braces adjustably secured to the combined upper side and handle bars and to the combined lower side bars and supporting-legs, substantially as set forth.

4. A wheelbarrow-frame comprising combined upper side and handle bars, combined lower side bars and supporting-legs cross-braces adjustably secured to the combined upper side and handle bars and to the combined lower side bars and supporting-legs, front and rear side braces adjustably secured to the combined upper side and handle bars and to the combined lower side bars and supporting-legs and connecting-braces secured to the forward ends of the combined upper side and handle bars and the combined lower side bars and supporting-legs, substantially as set forth.

In testimony that we claim the foregoing as our invention we have signed our names, in presence of two witnesses, this 31st day of August, 1901.

EDWARD A. GARVER.
DONALD V. STOUT.

Witnesses:
ALEXANDER BEVER,
IRA BROWN.